United States Patent
Hall (10) Patent No.: US 7,917,169 B1
(45) Date of Patent: Mar. 29, 2011

(54) SYSTEM AND METHOD FOR MOBILE AD HOC NETWORK

(75) Inventor: Robert J. Hall, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 474 days.

(21) Appl. No.: 11/289,898

(22) Filed: Nov. 30, 2005

(51) Int. Cl.
*H04W 4/00* (2009.01)

(52) U.S. Cl. .................. 455/552.1; 455/553.1; 370/310

(58) Field of Classification Search ..... 455/552.1–553.1
See application file for complete search history.

(56) References Cited

U.S. PATENT DOCUMENTS

| | | | |
|---|---|---|---|
| 6,304,556 | B1 | 10/2001 | Haas |
| 6,807,165 | B2 | 10/2004 | Belcea |
| 6,816,460 | B1 | 11/2004 | Ahmed et al. |
| 6,879,574 | B2 | 4/2005 | Naghian et al. |
| 6,909,706 | B2 | 6/2005 | Wilmer et al. |
| 6,937,602 | B2 | 8/2005 | Whitehill et al. |
| 6,940,832 | B2 | 9/2005 | Saadawi et al. |
| 6,954,435 | B2 | 10/2005 | Billhartz et al. |
| 6,958,986 | B2 | 10/2005 | Cain |
| 7,027,822 | B1 | 4/2006 | Hwang et al. |
| 7,152,110 | B2 | 12/2006 | Pierce |
| 7,197,326 | B2 | 3/2007 | Acampora |
| 7,295,521 | B2 | 11/2007 | Choi et al. |
| 7,307,978 | B2 | 12/2007 | Carlson |
| 7,525,933 | B1 | 4/2009 | Hall |
| 7,613,467 | B2 | 11/2009 | Fleischman |
| 2002/0155846 | A1 | 10/2002 | Shiraga |
| 2002/0167960 | A1 | 11/2002 | Garcia-Luna-Aceves |
| 2003/0235158 | A1 | 12/2003 | Lee |
| 2004/0213270 | A1* | 10/2004 | Su et al. ........................ 370/401 |
| 2005/0058151 | A1 | 3/2005 | Yeh |
| 2005/0152318 | A1* | 7/2005 | Elbatt et al. .................. 370/338 |
| 2005/0152378 | A1 | 7/2005 | Bango et al. |
| 2005/0254453 | A1 | 11/2005 | Barneah |
| 2005/0259597 | A1 | 11/2005 | Benedetto |
| 2006/0013154 | A1* | 1/2006 | Choi et al. .................... 370/312 |
| 2006/0023677 | A1 | 2/2006 | Labrador |
| 2006/0084444 | A1 | 4/2006 | Kossi et al. |
| 2006/0126535 | A1* | 6/2006 | Sherman ....................... 370/254 |
| 2006/0148516 | A1* | 7/2006 | Reddy et al. ............... 455/552.1 |
| 2006/0153157 | A1 | 7/2006 | Roh et al. |
| 2007/0008925 | A1* | 1/2007 | Dravida et al. ............... 370/331 |
| 2007/0019594 | A1 | 1/2007 | Perumal et al. |
| 2007/0217346 | A1 | 9/2007 | Zheng |
| 2008/0080401 | A1 | 4/2008 | Ribiere |

(Continued)

OTHER PUBLICATIONS

Y. Ko and N. Vaidya, Flooding-Based Geocasting Protocols for Mobile Ad Hoc Networks, Mobile Nteworks and Applications pp. 7, 471-480. Dec. 2002.*

(Continued)

*Primary Examiner* — Charles N Appiah
*Assistant Examiner* — Jaime M Holliday
(74) *Attorney, Agent, or Firm* — Woodcock Washburn LLP (57) ABSTRACT

A method and system for geocasting data packets in a MANET. The MANET is combined with a long-range network such that a wireless terminal can decide whether to rebroadcast a geocast packet over the MANET, the long-range network, or not at all, depending on the wireless terminal's proximity to the geocast region, the location of the originating wireless terminal, or both. A wireless terminal close to or within the geocast region can rebroadcast on the MANET, whereas a wireless terminal far from the geocast region can rebroadcast on the long-range network.

24 Claims, 4 Drawing Sheets

U.S. PATENT DOCUMENTS

2008/0159236 A1 7/2008 Ch'ng
2008/0192737 A1 8/2008 Miyazaki
2009/0041039 A1 2/2009 Bear
2009/0175223 A1 7/2009 Hall
2009/0201860 A1 8/2009 Sherman et al.

OTHER PUBLICATIONS

Y. Ko and N. Vaidya, Geocasting in Mobile Ad Hoc Networks: Location-Based Multicast Algorithms, Technical Report TR-98-018 Texas A & M University, Sep. 1998.

Hall et al., "A Two-Level Quality of Service Scheme for Collision Based Mobile Ad Hoc Networks", IEEE, 1-4244-1513-06/07, 8 pages.

Hall, "RTEQ: Modeling and Validating Infinite-State Hard-Real-Time Systems", AT&T Labs Research, ASE 2007, Nov. 2007, 4 pages.

Ilyas, "Body, Personal, and Local Ad Hoc Wireless Networks", Chapter 1, CRC Press, 2003, 22 pages.

Liao et al., "GRID: A Fully Location-Aware Routing Protocol for Mobile Ad Hoc Networks", Telecommunication Systems, 2001, vol. 18, pp. 1-26.

Shih et al., "A Distributed Slots Reservation Protocol for QoS routing on TDMA-based Mobile Ad Hoc Networks", Networks, 2004 (ICON 2004) Proceedings, $12^{th}$ IEEE International Conference, Nov. 2004, vol. 2, pp. 660-664.

Shih et al., "CAPC: A Collision Avoidance Power Control MAC Protocol for Wireless Ad Hoc Networks", IEEE Communications Letters, Sep. 2005, vol. 9, No. 9, pp. 859-861.

Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.

* cited by examiner

SYSTEM AND METHOD FOR MOBILE AD HOC NETWORK

RELATED APPLICATION

This application is related to application Ser. No. 11/289,899 filed Nov. 30, 2005, now U.S. Pat. No. 7,525,933 B1 entitled "System and Method for Mobile Ad Hoc Network,".

BACKGROUND OF THE INVENTION

The present invention is directed to mobile ad hoc networks (MANETs). More specifically, the present invention is directed to a system and method for multicasting data packets in a MANET.

A MANET is basically a network of mobile wireless terminals, such as wireless phones, that communicate with each other within a given region or area. A MANET does not require or use "base station" terminals to control the communications between the wireless terminals. Each wireless terminal is capable of receiving/transmitting data packets to/from other wireless terminals in the MANET.

In a MANET, when a wireless terminal intends to send the same information to more than one destination (i.e. more than one wireless terminal recipient), it will typically broadcast (i.e. transmit the information so that any terminal within range can receive it) or multicast (i.e. a series of broadcasts from terminal to terminal through the network) the information instead of transmitting a series of unicasts (a separate transmission to each intended recipient). In a traditional broadcast, the broadcasting wireless terminal will simply transmit the information once and hope that all the intended recipients are in range to receive the transmission. The intended recipients that are outside the range of the broadcasting terminal, however, will not be able to receive the message. Another technique such as multicasting would have to be used to get the message to such remote terminals.

In a conventional multicast, the intended recipients register to a predetermined group address. The originating (sending) wireless terminal will address the message to the group address and transmit the message once. The message will then be passed or retransmitted from wireless terminal to wireless terminal (multicast) throughout the MANET so that all the group members have a chance of receiving the multicast message no matter where they are located. Multicasting has been found to be a much more effective technique than broadcasting when intended recipients are located outside the range of the originating wireless terminal.

Although multicasting, and in some cases broadcasting, are effective when the intended recipients are scattered throughout the MANET, they are not efficient for applications where the intended recipients are all located in a defined physical area. For example, when trying to send messages to everyone in a disaster area or all troops in a given battle venue, multicasting can result in utilizing the processing power of the MANET for many unnecessary transmissions. That is, multicasting may result in multiple retransmissions or rebroadcasts by wireless terminals that are not the intended recipients and by wireless terminals that are located in areas remote from the disaster area or the battle venue. Moreover, due to the fact that mobile terminals move often and unpredictably, it is impractical to maintain a (registered) multicast group for each arbitrary geographic region. As a result, for such applications, a technique called geographical broadcasting, or geocasting, is preferred.

The basic idea of a geocast is to send a packet to every node geographically positioned within a specified region called a geocast region. The set of wireless terminals in the geocast region are referred to as the geocast group. If a wireless terminal resides in the geocast region it will automatically become a member of the corresponding geocast group, and thus no registration is necessary (as in conventional multicasting). A wireless terminal may therefore send a message to every wireless terminal in the geocast group by simply addressing the message to the geocast region.

One approach that has been proposed for geocasting in a MANET is a technique called location-based flooding. Geocasting through location-based flooding requires that the wireless terminals in the MANET are equipped with the ability to determine their own location using, for example, a Global Positioning System (GPS), and are able to determine the coordinates that define the geocast region (typically from a geographic "address" within the data packet itself). The wireless terminal initiating or originating the communication will address the packets to include its own location coordinates and a description of the geocast region, and then broadcast the packets to its neighboring wireless terminals. Each neighboring wireless terminal will then compare the geocast region coordinates to its own location. If its location is within the specified geocast region, it will accept the packet, process it, and may also decide to rebroadcast, or retransmit, the packet to its neighboring wireless terminals. If its location is outside the geocast region, it will not process the packet but it may decide to retransmit the packet in order to further propagate it to wireless terminals that may not as yet have received the packet. If the wireless terminal decides to retransmit, it will replace the location information of the originating terminal in the packet with its own location information. This process will be repeated as the packet is retransmitted through the MANET.

In such present-day systems, the decision whether to retransmit is typically made based upon a location-based flooding decision algorithm which may take into account from how far away the received packet was transmitted. To do this, the wireless terminal that receives the packet will compare its present geographical location to the geographical location of the sending wireless terminal (obtained from the location information in the packet). Packets that have been received from sending terminals that are located no closer than some minimum distance away are retransmitted. All other packets may be dropped.

Although such present-day location-based flooding algorithms are simple and robust, they are not efficient for geographically large MANETs. In geographically large MANETs, such algorithms may result in the packets traveling paths having many "hops" and therefore taking a long time to be transmitted from source to destination. In addition, when the MANET includes a large number of wireless terminals in an extended area, such algorithms tend to result in many unnecessary retransmissions, wasting the resources of the MANET. Yet further, when the path between the source and the destination terminals are separated by large empty gaps (gaps so large that wireless terminals cannot transmit across the gap), such algorithms fail altogether.

BRIEF SUMMARY OF THE INVENTION

The present invention provides a more efficient system and method for geocasting data packets in a MANET. This is accomplished by combining the MANET with a long-range network and limiting retransmissions by a wireless terminal based on its proximity to the originating terminal, a retransmitter of the packet, and/or the geocast region. The result is a network in which some retransmissions of geocast packets will be offloaded from the MANET to the long-range network and retransmissions on the MANET will be limited to terminals that are within some minimum distance of the origination wireless terminal and/or the geocast region. In doing this, the number of retransmissions on the MANET and the total number of retransmissions for any given packet will be reduced over the prior art. In addition, use of the long-range network enables packet to be communicated over paths between wireless terminals that are separated by large empty gaps (no intermediate wireless terminals located in the gap) over which communications in the MANET alone would fail, thereby further overcoming limitations of the prior art.

In one embodiment of the invention, two spatially limited geographic regions are defined within the MANET and then connected via a long-range network. One region, termed the origination region, is a geographic region containing the original sender (originating terminal) of the packet. The other region, termed the termination region, is a geographic area containing the geocast region within it. In such an embodiment, the geocast region may be a circle of first specified radius, the origination region may be a circle of a second specified radius around the sender or originating terminal, and the termination region may be a circle of a third specified radius (larger than the first specified radius) around the geocast region.

A geocast in such an embodiment may proceed as follows. A packet is first transmitted from an originating wireless terminal via a location-based flooding algorithm to all wireless terminals within the origination region. Each wireless terminal in the origination region that is long range capable will transmit the packet on the long-range network to long range capable wireless terminals located within the termination region. The wireless terminals located within the termination region will then transmit the packet on the MANET using, for example, a location-based flooding algorithm. Since the geocast region is a subset of the termination region, the location-based flood in the termination region will result in the geocast group receiving the packet, thereby completing the geocast. In this way, for each geocast, not every reachable wireless terminal in the MANET will have to rebroadcast. Instead, only a subset of the wireless terminals located within the origination region and a subset of the wireless terminals located within the termination region will retransmit the packet, thereby reducing the amount of processing power and wireless bandwidth used for each geocast. In addition, by using the long-range network, many-hop paths on the MANET can be replaced by fewer-hop paths taken via long-range network transmissions, thereby reducing packet latency for paths covering long geographic distances.

These and other advantages of the invention will be apparent to those of ordinary skill in the art by reference to the following detailed description and the accompanying drawings.

DETAILED DESCRIPTION

Figure 1:
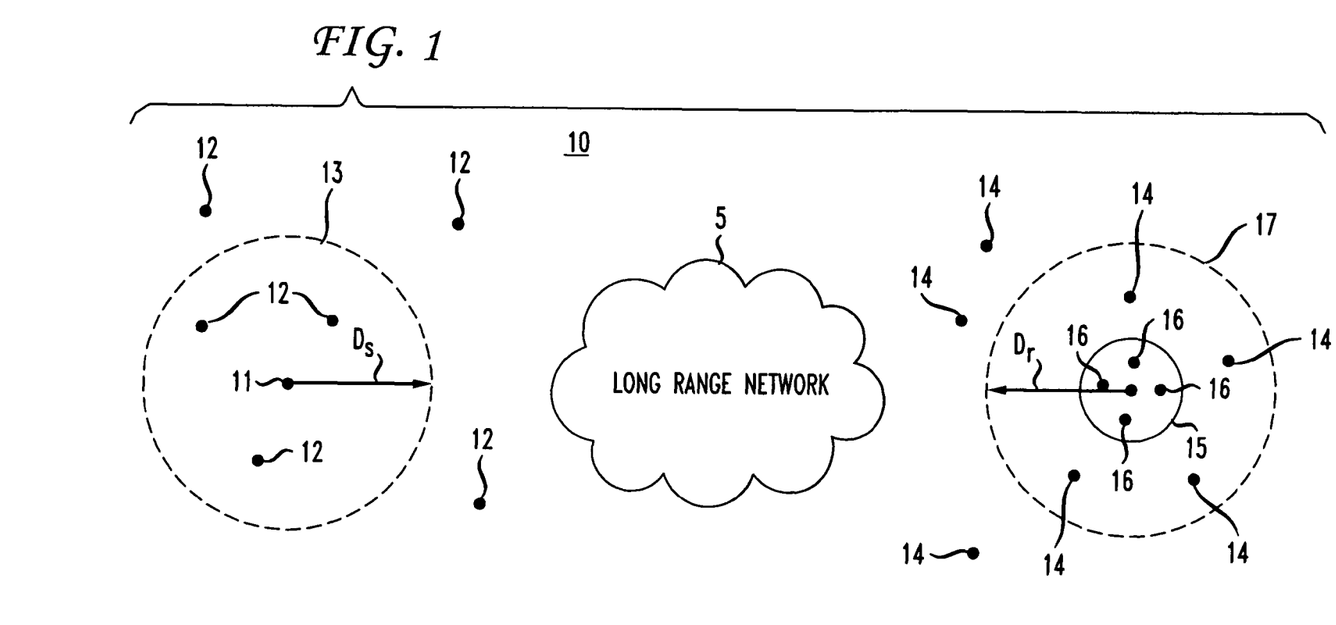
FIG. 1 illustrates a network in accordance with an embodiment of the present invention.

FIG. 1 shows a network 10 in accordance with an embodiment of the present invention. As shown, network 10 includes a plurality of wireless terminals 11, 12, 14 and 16 that form a MANET. Each wireless terminal 11, 12, 14 and 16 is operable to determine its own geographical location through any type of location determination system including, for example, the Global Positioning System. Each wireless terminal is operable to transmit and receive packets on the MANET. In addition, at any given time, some subset (possibly all) of the wireless terminals may be operable to transmit and receive packets over a long-range network 5. The long-rang network 5 can be any network in which packets can be transmitted from one long-range capable wireless terminal to another long-range capable wireless terminal. Many such packet networks, for example an infrastructure-based network comprising wireless base stations (for up- and down-link) operating on a separate frequency from that used by the MANET transmissions and connected together by a wired network using switches and fiber optic links, are well known in the art and need not be described in detail herein. In addition, the long-rang network 5 could also be implemented simply as another instance of a MANET using distinct radio frequencies and longer radio ranges.

Network 10 has an origination region 13 that covers a circular geographical area with a diameter Ds around wireless terminal 11 as the center point. Network 10 also has a termination region 17 that covers a circular geographical area with a diameter Dr having the center of the geocast region 15 as the center point. Of course, those skilled in the art can recognize that the origination and termination regions can be defined in terms of other geometric shapes such as rectangles, hexagons, irregular shapes, curvilinear shapes, or in any desired mixture of such shapes. Moreover, the information that defines these regions, e.g. the location, size and shape, can be carried in the packets themselves. The information may therefore vary from packet to packet or it can be fixed in advance of communications (and in such an embodiment need not be carried in each packet).

In network 10, as shown, originating wireless terminal 11 and some of its neighboring wireless terminals 12 are located within the origination region 13. Some of the wireless terminals 14 and all of the wireless terminals 16 (which are located in the geocast region) are located within the termination region 17.

In network 10, when originating wireless terminal 11 wants to geocast a packet to wireless terminals 16 located in geocast region 15, it will address the packet with its own location coordinates (as the sending location) and the location coordinates of the geocast region. If the originating wireless terminal is not long range capable at the time it wishes to transmit, it will then initiate a location-based flooding of the packet to all neighboring wireless terminals 12 on the MANET. A wireless terminal 12 that is long-range capable at the time of receiving the packet (whether in the origination region 13 or not) will retransmit the packet on the long-rang network 5 to all long range capable terminals 14 or 16 lying within the termination region. The long-range transfer can be achieved by multicast or by any other means known in the art. Of course, it can be appreciated that other techniques may be used, such as broadcast, a series of unicasts, geocasts, or other techniques for notifying a set of recipients of a single transmission. In a particular embodiment, if a plurality of wireless terminals 12 receive the packet, only the first wireless terminal 12 to receive the packet will retransmit the packet on the long-range network 5; the others will avoid retransmitting on the long-rang network 5 if they determine that the same packet has already been thus transmitted. Each long range capable wireless terminal 14 or 16 will receive the packet and compare its own location to the location of the geocast region 15. If the location of the receiving wireless terminal 14 or 16 is within a distance Dr of the geocast region 15, hence lying within the termination region 17, it may choose to transmit the packet on the MANET, initiating or continuing the simple location-based flooding of the termination region. Again, the decision of whether to transmit as part of the location-based flooding may be made based upon a location-based flooding decision algorithm such as the one described below and shown in FIG. 3. If a wireless terminal 14 that is not located within the termination region (and not within the origination region) receives the packet, it will not retransmit the packet on the MANET.

If, on the other hand, the originating wireless terminal 11 is itself long range capable at the time it wishes to send and not already lying in the termination region (as shown in FIG. 1, for example), it will transmit the packet on the long-rang network 5 to all long range capable terminals 14 or 16 lying within the termination region. In this case, the originating terminal 11 does not also transmit the packet on the MANET, as this would be unnecessary in the origination region, the goal of getting the packet onto the long-rang network 5 having already been achieved.

Packets transmitted over the long-rang network 5 from the wireless terminals 12 will be received over the long-rang network 5 by wireless terminals 14 and 16. The wireless terminals 14 that are located outside the distance Dr from the geocast region 15, and thus outside the termination region 17, will not retransmit the packet on the MANET. The wireless terminals 14 that are located within the termination region 17 and the wireless terminals located within the geocast region 15 will participate in location-based flooding of the termination region and hence may decide to retransmit the packet on the MANET.

In network 10, it should therefore be understood that the retransmission of packets is limited depending on the long range capability of the wireless terminal, and the proximity of the wireless terminal to the origination wireless terminal 11 and the geocast region 15. The size and shape of the origination region and the termination region can be any size and shape desired by those skilled in the art. It can be appreciated by those skilled in the art, however, that by increasing the distance Dr or the size of the termination region 17, the number of rebroadcasts on the MANET will thereby tend to increase. By decreasing the size of the termination region 17 or the distance Dr, the amount of rebroadcasts on the MANET may decrease. Similarly, it can be appreciated by those skilled in the art that by increasing the size of the origination region 13 or the distance Ds, the number of rebroadcasts on the long-rang network 5 will tend to increase. By decreasing the size of the origination region 13 or the distance Ds, the amount of rebroadcasts on the long-rang network 5 may decrease. However, it is also clear that decreasing either the origination region 13 or the termination region 17, or both, may result in the packet failing to reach the geocast region, as it may occur that no wireless terminal within the smaller origination or termination region is long range capable at the time the packet is to be transmitted. As a result, the appropriate choice of Ds and Dr, or the size of the origination region 13 and termination region 17, can be made when judging the typical geographic distributions of nodes and the required reliability of communications as determined by each particular application of the present invention.

Figure 3:
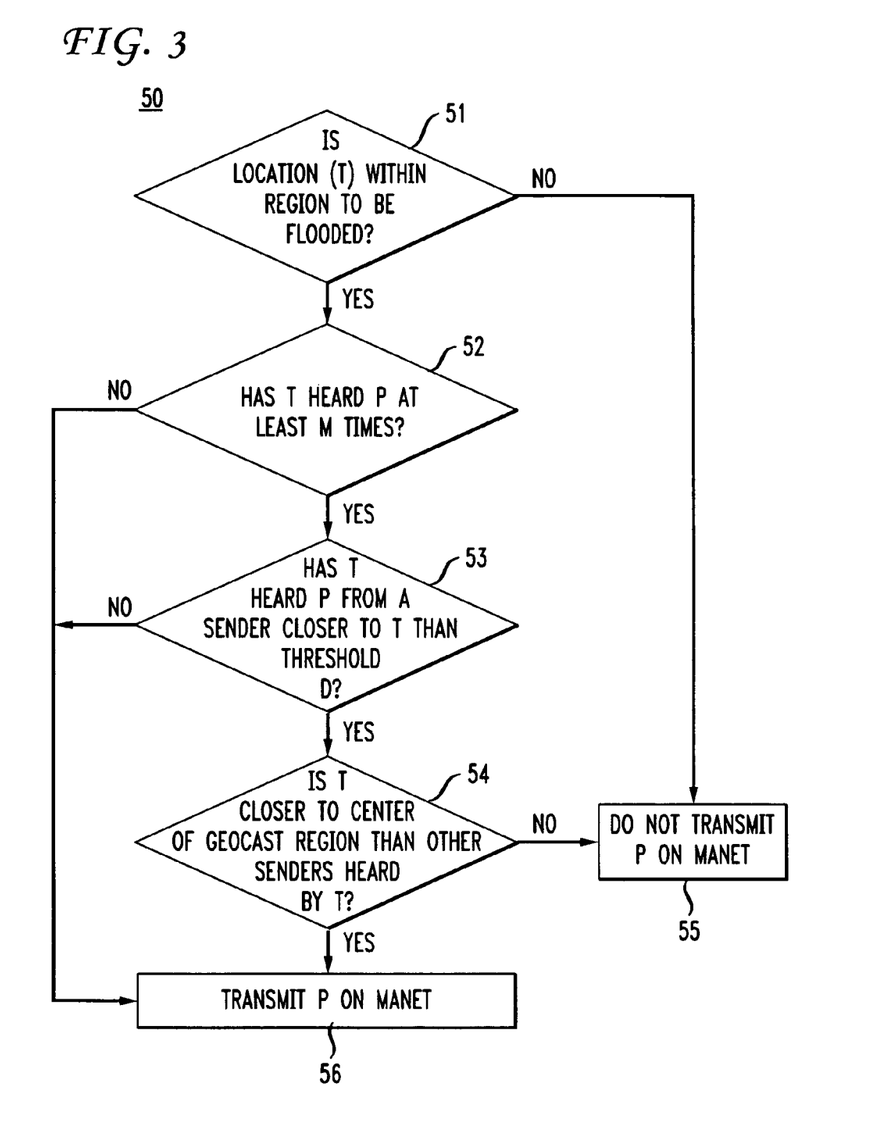
FIG. 3 illustrates a method for location-based flooding in a network in accordance with an embodiment of the present invention.

Referring to FIG. 3, there is shown a method 50 for use by a wireless terminal in accordance with the present invention to decide whether to retransmit a geocast packet over the MANET. As shown method 50 begins with step 51 where a wireless terminal T upon receiving a geocast packet determines whether it is located within a termination region that covers a geographical area including the geocast region. The termination region may be a region of any desired shape and size such as a circle having a given radius but should be geographically located such that the area that it covers includes the geocast region. The wireless terminal T may determine whether it is located in the termination region by any desired means including, for example, using a Global Positioning System to determine its geographical location, and using location information in the geocast packet to determine the location, size, and shape of the geocast region and thus the termination region. The wireless terminal T may then compare its geographical location to the location information of the termination region.

If the wireless terminal T is not located within the termination region then it will proceed to step 55 wherein it will not retransmit the received geocast packet on the MANET. If the wireless terminal T is located within the termination region then, at step 52, it will determine whether it received the same geocast packet at least some minimum number of times M. If the geocast packet was not already received at least some minimum number of times M then, at step 56, the wireless terminal T will retransmit the packet on the MANET. If the packet already was received some minimum number of times M then, at step 53, the wireless terminal T will determine whether it has received the geocast packet from a sending wireless terminal that is closer to wireless terminal T than some minimum distance D. The wireless terminal T may make this determination by comparing its present geographical location (e.g. determined using a global positioning system) to the location of the sending wireless terminal that transmitted the geocast packet. The location of the sending wireless terminal may be determined using location information in the geocast packet. As is known in the art, location information of the sender of a packet is including in geocast packets. Such location information is typically in the form of geographical coordinates. Such geographical coordinates of the sending wireless terminal may therefore be compared by wireless terminal T to its own geographical coordinates to make the determination of step 53.

If the sending wireless terminal is determined to not be located within the minimum distance D then, at step 56, wireless terminal T will transmit the packet on the MANET. If the sending wireless terminal is determined to be located within the minimum distance D then, at step 54, wireless terminal T will determine whether it is located closer to the center of the geocast region than any sending terminal from which the same packet was received by wireless terminal T. Wireless terminal T may make this determination by comparing its geographical location to the location coordinates of the sending terminal found in each of the packets it received (as described above).

If wireless terminal T is determined to be closer to the center of the geocast region than any other sending terminal from which it received the same packet then, at step 56, wireless terminal T will transmit the packet on the MANET. If any of the sending wireless terminals are closer than wireless terminal T then, at step 55, wireless terminal T will not transmit the packet on the MANET.

By limiting retransmissions on the MANET to wireless terminals that have not previously received the same packet some minimum number of times (see step 52), method 50 reduces the number of repeated retransmissions of the same packet on the MANET over prior art systems. In addition, by limiting retransmissions of a given packet on the MANET to wireless terminals that are closest to the center of the geocast region (see step 54), method 50 further reduces the number of retransmissions of the same packet on the MANET over the prior art. This preference of transmissions near the center of the geocast region can also improve coverage (likelihood of packet reaching all nodes in the geocast region) in some applications.

Figure 4:
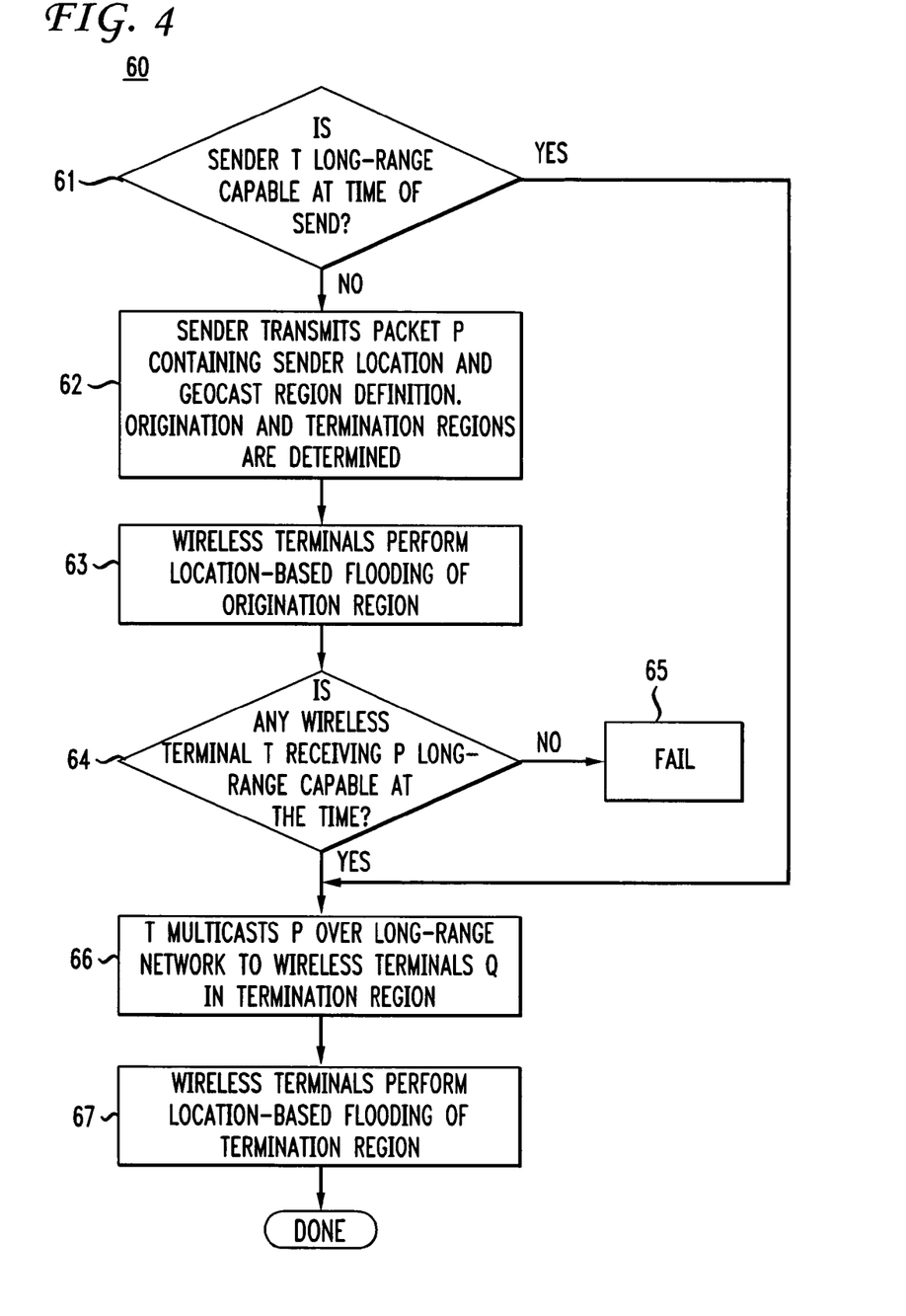
FIG. 4 illustrates a method for geocasting using a long-range network in accordance with an embodiment of the present invention.

Referring now to FIG. 4, there is shown a method 60 for use by a wireless terminal in accordance with the present invention to decide whether to retransmit a geocast packet over the long-range network. As shown, method 60 begins at step 61 wherein a wireless terminal T that originally intends to transmit a geocast packet P to a geocast region first determines whether it is capable of transmitting the packet P over a long-range network. If so, then at step 66 originating wireless terminal T will multicast the packet over the long-range network to wireless terminals Q located in a termination region that includes the geocast region. If not, then at step 62 the originating wireless terminal T will transmit the packet P on the MANET. The packet will contain information including the location of the originating terminal T and a definition of the geocast region. Information in the definition of the geocast region is well known and includes information that enables wireless terminals to determine location information of the geocast region including, for example, location coordinates that define the location, size, and shape of the geocast region.

Also at step 62, the wireless terminals that receive the transmission over the MANET from the originating wireless terminal will determine location information of an origination region and a termination region. The determination of the origination region and the termination region may be made in any way desired by those skilled in the art. For example, the origination region may be fixed a priori by common agreement (e.g. all terminals will use a circular area having a radius X around the originating terminal and a radius Y around the center of the geocast region). Or, as another example, the origination region and the termination region may be specified by the origination terminal in the packet as part of the addressing information.

At step 63, the wireless terminals that received that geocast packet from the originating wireless terminal T on the MANET will then perform location-based flooding of the MANET. Such location-based algorithms are known in the art. In conducting the location-based flooding, at step 64, each wireless terminal will determine whether it is long-range capable (i.e. whether it is operable to transmit the packet on the long-range network) at the time it intends to retransmit the packet. If no terminals are long-range capable, then the geocast will fail at step 65. For any terminal that is long-range capable, it will multicast the packet over the long-range network to wireless terminals Q located in the termination region at step 66. Then, at step 67, the wireless terminals Q in the termination region will perform location-based flooding of the termination region.

By offloading retransmissions of geocast packets from the MANET to the long-range network, method 50 reduces the amount of MANET processing power utilized for each geocast over the prior art. For example, method 50 makes it possible that for each geocast not every reachable wireless terminal in the MANET will have to rebroadcast. Instead, only a subset of the wireless terminals located within the origination region and a subset of the wireless terminals located within the termination region will retransmit the packet, thereby reducing the amount of processing power and wireless bandwidth used for each geocast. In addition, by using the long-range network, many-hop paths on the MANET can be replaced by fewer-hop paths taken via long-range network transmissions, thereby reducing packet latency for paths covering long geographic distances.

Figure 2:
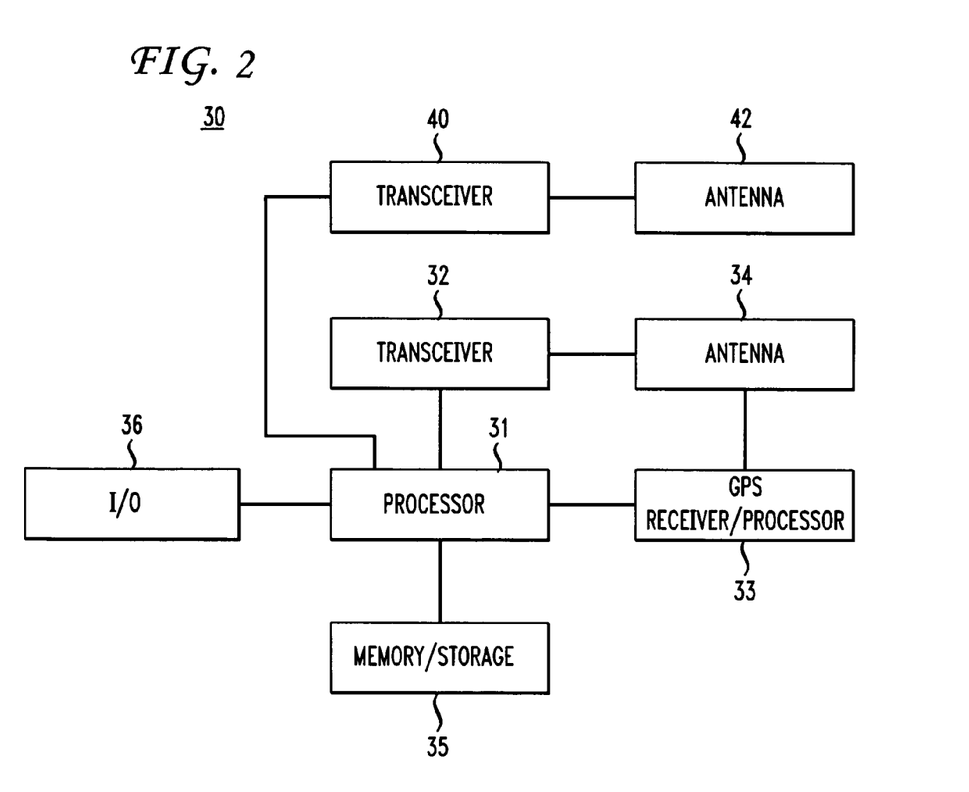
FIG. 2 shows a wireless terminal for operation in a network in accordance with an embodiment of the present invention.

It should be understood that a wireless terminal in accordance with the present invention may be any wireless device operable to execute a communications application to perform the above described functions. Such wireless terminals executing a communications application are well known in the art, and may be implemented, for example, using well known processors, transceivers, memory units, storage devices, computer software, and other components. A high level block diagram of such a wireless terminal 30 is shown in FIG. 2. As shown, wireless terminal 30 contains a processor 31 which controls the overall operation of wireless terminal 30 by executing computer program instruction which define the communications application. The computer program instructions may be hard coded in processor 31 or loaded from an erasable programmable read only memory device (not shown) or other non-volatile memory device as are known in the art when execution of the computer program instructions is desired. Thus, the communications application will be defined by computer program instructions stored in processor 31 and/or erasable programmable read only memory (not shown) and the communications application will be controlled by processor 31 executing the computer program instructions. Wireless terminal 30 includes a memory storage device 35 in which information including geographic location information described above can be stored. Wireless terminal 30 also include a transceiver 32 coupled to an antenna 34 through which data is received and/or transmitted in a MANET. Wireless terminal 30 also includes a transceiver 40 coupled to a long-range antenna 42 through which data is received and/or transmitted in a long-range network. As is understood by those skilled in the art, an alternative embodiment could use a single antenna and transceiver for both purposes as long as the transceiver is capable of operating on both the MANET and the long range network. Radios with tunable parameters governing range, frequency, and even waveform are well known in the art. Wireless terminal 30 also includes a GPS receiver/processor 33 that controls the execution of the geographical locating function of wireless terminal 30. Through GPS receiver/processor 33, wireless terminal 30 can use the global positioning system to determine its own location. Wireless terminal 30 also includes input/output 36 which represents devices (e.g., display, keypad, speakers, buttons, etc.) that allow for user interaction with wireless terminal 30. One skilled in the art will recognize that an implementation of an actual wireless terminal will contain other components as well, and that FIG. 2 is a high level representation of some of the components of such a wireless terminal for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A wireless terminal comprising:
   means for determining the geographical location of the wireless terminal;
   means for receiving a geocast packet originally transmitted from an originating terminal, the geocast packet including an identification of a geocast region;
   means for determining on which one of a plurality of networks to retransmit the geocast packet, or not at all, based on:
      a distance between the wireless terminal's geographical location and a location of the originating terminal,
      whether the geocast packet has been transmitted over the long range network, and
      a distance between the wireless terminal's geographical location and the geocast region;
   means for transmitting the geocast packet on a MANET; and
   means for transmitting the geocast packet on the long range network;
   wherein the means for determining on which one of a plurality of networks to retransmit the geocast packet, or not at all, determines not to retransmit said the geocast packet if:
      the geocast packet has already been transmitted over the long range network,
      the wireless terminal is not located within the geocast region, and
      the distance between the wireless terminal's geographical location and the location of the origination terminal is greater than a threshold.

2. The wireless terminal of claim 1 wherein the plurality of networks comprises a MANET and a long-range network.

3. The wireless terminal of claim 1 wherein the means for receiving comprises:
   means for receiving the geocast packet on a MANET; and
   means for receiving the geocast packet on a long-range network.

4. The wireless terminal of claim 1 wherein the means for determining on which one of a plurality of networks to retransmit the geocast packet, or not at all, based on the wireless terminal's geographic location, comprises:
   means for determining whether the wireless terminal's means for transmitting on a long range network is operable at the time of transmission, wherein the determination results in a determination to retransmit the geocast packet on a long range network if the means for transmitting on a long range network is operable at the time of transmission.

5. The wireless terminal of claim 1 wherein the means for determining on which one of a plurality of networks to retransmit the geocast packet, or not at all, based on the wireless terminal's geographic location comprises:
   means for identifying an origination region within which the originating terminal is located; and
   means for determining the wireless terminal is located within the origination region, wherein the determination results in a determination to retransmit the geocast packet on a MANET if the wireless terminal is located within the origination region and if the means for transmitting on a long range network is not operable at the time of transmission.

6. The wireless terminal of claim 5 wherein the means for determining the wireless terminal is located within the origination region comprises:
   means for using the information in the geocast packet to determine the location information of the origination region; and
   means for comparing the geographical location of the wireless terminal to the location information of the origination region to determine whether the wireless terminal is located within the origination region.

7. The wireless terminal of claim 6 wherein the origination region is a circle of a first radius $R_o$.

8. The wireless terminal of claim 1 wherein the means for determining the location of the wireless terminal comprises a global positioning system receiver/processor.

9. The wireless terminal of claim 1 wherein the means for determining on which one of a plurality of networks to retransmit the geocast packet, or not at all, based on the wireless terminal's geographic location comprises:
   means for identifying a termination region within which the geocast region is located; and
   means for determining whether the wireless terminal is located within the termination region, wherein the determination results in a determination to retransmit std the geocast packet on std the MANET if std the wireless terminal is located within std the termination region.

10. The wireless terminal of claim 9 wherein the means for determining whether the wireless terminal is located within the termination region comprises:
    means for using the information in the geocast packet to determine location information of the termination region; and
    means for comparing the geographical location of the wireless terminal to the location information of the termination region to determine whether the wireless terminal is located within the termination region.

11. The wireless terminal of claim 10 wherein the termination region is a circle of a first radius $R_t$.

12. A method for geocasting, the method comprising the steps of:
    receiving at a wireless terminal a geocast packet originally transmitted from an originating terminal, the geocast packet including an identification of a geocast region; and
    determining on which of a plurality of networks to retransmit the geocast packet, or not at all, based on:
       a distance between the wireless terminal and the geocast region,
       whether the geocast packet has been transmitted over the long range network, and
       a distance between the wireless terminal and the originating terminal;
    wherein the determining step determines not to retransmit the geocast packet if:
       the geocast packet has already been transmitted over the long range network,
       the wireless terminal is not located within the geocast region, and
       the distance between the wireless terminal and the originating terminal is greater than a threshold.

13. The method claim 12 further comprising the step of transmitting the geocast packet on a MANET or a long-range network depending on the determining step.

14. The method of claim 12 wherein said step of receiving comprises the step of:
    receiving the geocast packet on one of a MANET and a long-range network.

15. The method of claim 12 wherein the step of determining on which of a plurality of networks to retransmit the geocast packet, or not at all, based on the wireless terminal's proximity to the geocast region and the originating terminal comprises the step of:
  identifying the originating region within which the originating terminal is located; and
  determining the wireless terminal is located within the originating region.

16. The method of claim 15 wherein the step of determining whether the wireless terminal is located within the originating region comprises the steps of:
  determining the geographical location of the wireless terminal;
  using the information in the geocast packet to determine location information of the origination region; and
  comparing the geographical location of the wireless terminal to the location information of the origination region to determine whether the wireless terminal is located within the origination region.

17. The method of claim 16 wherein the origination region is a circle of a first radius $R_o$.

18. The method of claim 16 wherein the step of determining the geographical location of the wireless terminal comprises the step of using a global positioning system.

19. The method of claim 12 wherein the step of determining on which of a plurality of networks to retransmit the geocast packet, or not at all, based on the wireless terminal's proximity to the geocast region and the originating terminal comprises the steps of:
  identifying a termination region within which the geocast region is located; and
  determining whether the wireless terminal is located within the termination region.

20. The method of claim 19 wherein the step of determining whether the wireless terminal is located within the termination region comprises the steps of:
  determining the geographical location of the wireless terminal;
  using the information in the geocast packet to determine location information of the termination region; and
  comparing the geographical location of the wireless terminal to the location information of the termination region to determine whether the wireless terminal is located within the termination region.

21. The method of claim 20 wherein the termination region is a circle of a first radius $R_t$.

22. The method of claim 20 wherein the step of determining the location of the wireless terminal comprises the step of using a global positioning system.

23. A network comprising:
  a MANET formed by a plurality of wireless terminals, each wireless terminal being operable to:
    receive a geocast packet originally transmitted from an originating terminal, the geocast packet including an identification of a geocast region;
    determine on which one of a plurality of networks to retransmit the geocast packet, or not at all, based on:
      a distance between the wireless terminal's geographical location and a location of the originating terminal,
      whether the geocast packet has been transmitted over the long range network, and
      a distance between the wireless terminal's geographical location and the geocast region;
    transmit the geocast packet on a MANET; and
    transmit the geocast packet on the long range network, wherein the geocast packet is not retransmitted if:
      the geocast packet has already been transmitted over the long range network,
      the wireless terminal is not located within the geocast region, and
      the distance between the wireless terminal's geographical location and the location of the origination terminal is greater than a threshold.

24. The network of claim 23 wherein the long range network is an infrastructure-based network comprising wireless base stations operating on a separate frequency from that used by the MANET transmissions and connected together by a wired network using switches and fiber optic links.

* * * * *